Jan. 26, 1943.                N. OPOTOW                2,309,270
                             DENTAL APPARATUS
                           Filed April 21, 1941
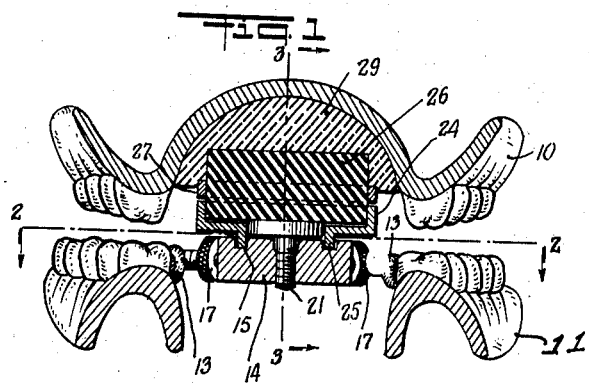
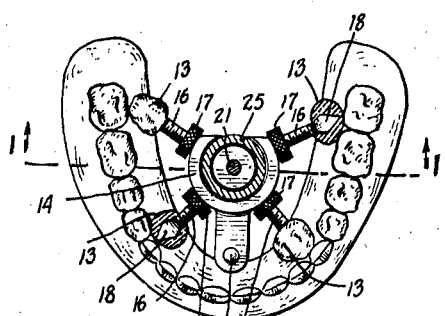    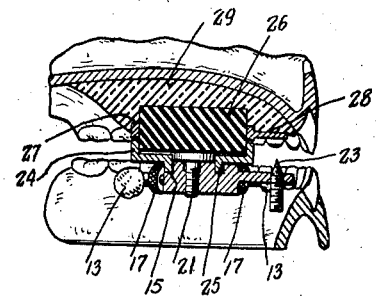
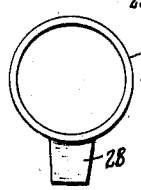 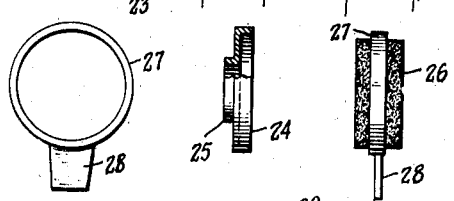    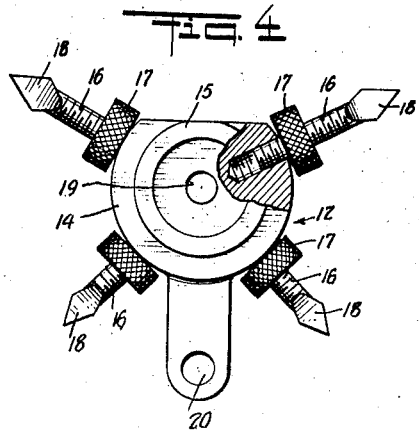
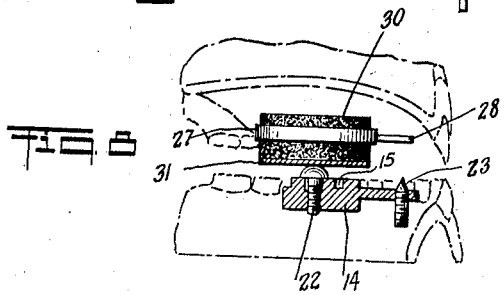
                                              INVENTOR.
                                    BY  Nathan Opotow
                                        Samuel Stephen Baker
                                              ATTORNEY Patented Jan. 26, 1943

2,309,270

UNITED STATES PATENT OFFICE 2,309,270

DENTAL APPARATUS

Nathan Opotow, New York, N. Y.

Application April 21, 1941, Serial No. 389,488

6 Claims. (Cl. 32—19)

My invention relates to dental plates and more particularly to an apparatus used on completed dentures to determine whether said dentures are accurately constructed and also to correct dentures found to be faulty.

This application is a continuation in part of my Patent No. 2,239,294 of April 22, 1941.

In said prior application, I described a method and apparatus for constructing dental plates after having recorded the bite of the patient under functional stress. In dental plates not constructed according to such a technique, the occlusion of said plates is most apt to be off balance since the actual biting action was not reproduced when the bite was taken. By the instant technique, however, in forcing the muscles of the mandible to exert pressure upon closure, the exact relationship of the mandible to the maxilla is determined under functional stress.

Even in plates constructed according to the aforesaid technique, the occlusion is sometimes off balance because during the processing of the dentures after the bite has been taken, there is often a dimensional change in the denture material resulting in the movement, however slight, of a tooth or teeth. This moved tooth, offering interference in occlusion, will result in discomfort.

Another consideration is the fact that although originally the dental plates might have been more or less accurate as regards centric, this accuracy might have been lost due to subsequent settling of gum tissue or to some other reason.

Bearing the foregoing in mind, it is an object of the present invention to provide a device capable of measuring the accuracy of completed dentures, meaning by accuracy, the proper relationship of the dental plates as regards the bite of the patient.

Another object of my invention is to record the discrepancy of finished dentures so that they may be repaired to meet the requirements of the patient.

Another object of my invention is to combine with such a testing device, means to repair the dentures in situ wherein the dentures may be balanced, as to occlusion, by the efforts of the patient so that the finished dentures will exactly conform to his actual biting movements.

Other objects of my invention will be apparent from the following description, it being understood that the above general statements of the objects of my invention are intended to describe and not to limit it in any manner.

Referring to the drawing:

Fig. 1 is a cross section along the line 1—1 of Fig. 2 showing the application of the device to artificial dentures preparatory to testing the same.

Fig. 2 is a section on the line 2—2 of Fig. 1.

Fig. 3 is a section along the line 3—3 of Fig. 1.

Fig. 4 is a plan view of the lower denture testing member partly broken away.

Fig. 5 is a plan view of a ring member used to establish the vertical dimension of the dentures.

Fig. 6 is a side view of the resilient member retaining cup, partly broken away.

Fig. 7 is a side view of the resilient member and ring member.

Fig. 8 is a view partly in section illustrating the intra-oral grinding of dentures.

Assuming the dental plates 10 and 11 are to be tested for balanced occlusion, the base member 12, constituting that part of the device to be mounted on the lower denture, is secured thereto by spots 13 of thermoplastic material known to the dental profession as "compound."

The member 12 comprises a substantially circular body 14 having a concentric slot 15 formed thereon.

Screws 16 are disposed in spaced relation around the body 12 and are threaded to cooperate with internally threaded bores in the body 12. Knurled lock nuts 17 are threaded upon screws 16 and are effective in maintaining the screws 16 in predetermined position in relation to the threaded bores of body 12. The screws 16 are provided with flat headed ends 18 which are anchored to the lower denture by the compound deposits 13.

Internally threaded bores 19 and 20, for receiving the screw 21 or 22 in bore 19, and screw 23 in bore 20, are formed in the member 12.

My invention is practiced in the following manner:

The member 12 is secured to lower plate 11, as aforesaid, spots of compound 13 connecting the flat headed ends 18 to the lower plate. Before so doing, however, the member 12 is adjusted as to size by operating the screws 16 and the lock nuts 17 maintain them as desired.

The flat headed screw 21 is now fully screwed into the bore 19 and a retaining cup member 24 is secured to the member 12 by having its collar 25 disposed and frictionally retained in the concentric slot 15.

A resilient pad 26 of rubber or like material is inserted in the opening of a ring member 27 which ring member has a platform 28 integral therewith. This resilient pad 26, together with the ring 27, is now placed in the retaining cup 24. A mass of soft plaster 29 is applied to the palate of the upper plate 10 and the plates 10 and 11 are now manually brought into occlusion. In a few moments the plaster 29 will set and when the plates 10 and 11 are separated, the ring 27 and resilient pad 26 will be found to be secured to the upper plate 10. It will be noted (Figs. 3 and 7) that the platform 28 is offset with respect to the inner edge of the ring 27 and, as seen in Fig. 3, the plaster 29 descends below the edge of the ring 27 thereby more securely anchoring it.

Now the retaining cup 24 is discarded and the plates are returned to the mouth of the patient. At this time some adjustments may be made before the test bite is taken. Vertical dimension of the plates may be adjusted by operating the screw 23, which, in cooperation with the platform 28 of ring 27, will space the plates as desired. Vertical dimension having been adjusted, the screw 21 is raised so that it will thereafter make contact with the resilient pad 26 when the bite is effected, as hereinafter set forth.

The patient is now instructed to close upon the resilient pad 26 and the screw 21 contacts and depresses the pad 26 in response to the pressure of the jaws of the patient.

Any variation of gum tissue not accounted for in the construction of the dentures will now become apparent, inasmuch as softened tissue will give in response to the pressure of the dental plate thereagainst and there will be no balanced occlusion of teeth under biting stress. In this manner can be determined the amount of compression the tissue undergoes when the dentures are forced firmly against it. The amount of compressibility is governed by the quality of the tissue so that if the tissue on one side is softer than on the other, the resilient pad 26, which offers the resistance during closure, will allow the dentures to seat themselves properly so that the amount of pressure on both sides is equalized and balanced.

When this test bite has been effected, the discrepancy in the occlusion of the two dentures may be recorded by interposing some plaster or wax between the dentures which, when set, indicates the changes to be made.

The proper relationship having been determined, the dentures may easily be altered to assume this relationship either by re-building the denture to occlude according to the new bite or, if where suitable, the plates may be spot-ground to conform to the indicated relationship.

I have also provided means to correct the dentures in situ through the efforts of the patient solely, so that the dentures are automatically altered when the patient goes through his natural biting movements. I prefer to use this method when the discrepancy in the occlusion is not great or in all cases where a superior result is desired even after re-setting or spot-grinding.

Under these conditions, I transform the device from a checking instrument to a milling device by removing the pad 26 from within the ring 27 and substituting therefor a resilient pad 30. This resilient pad 30, also made of rubber or similar material, is provided with a metal disc 31 secured to its lower surface in any suitable manner as by adhesive or when a rubber pad is utilized, the disc 31 may be heated and pressed against the rubber pad which will cause adhesion by the melting of the rubber.

The flat headed screw 21 is removed from within the bore 19 and the round head screw 22 substituted therefore so that it directly opposes the metal disc 31 on the resilient pad 30. The screw 22 is raised so that in conjunction with the pad 30 it maintains the dentures spaced. The screw 23 is lowered so as not to effect any contact with platform 28. In order to bite into occlusion, the patient must overcome the resistance of the resilient pad 30 and must therefore close under masticating stress. An abrasive paste, such as Carborundum or coarse graphite in a vehicle of glycerine or the like, is placed on the cusps of the lower teeth, the patient is instructed to bite on the pad 30 until there is cuspal contact, and then grind the lower teeth against the upper teeth, reproducing the action of the mandible in mastication.

The abrasive paste grinds down the points of interference or the high spots until the occlusion is balanced so that the dentures are milled under the particular biting stress of the patient and the individual jaw movement and muscular force of the patient are accounted for in the finished dentures.

This procedure may be used on old plates or on newly finished plates where the discrepancy due to faulty bite taking or denture processing is not too great.

I have shown a preferred embodiment of my invention but it is obvious that numerous changes and omissions may be made without departing from its spirit.

I claim:

1. A dental apparatus for determining the occlusion of dental plates comprising a base member to be connected to a denture, means to adjust said base member radially to facilitate said connection, a projection on said base member and a resilient member secured to an opposing denture, said projection being adapted to bear against the surface of and depress said resilient member when said dentures are caused to approach each other, said means to adjust said base member comprising extensible means of rigid material adapted to be extended outwardly in relation to said base member, whereby said rigid base member may be connected to various sized dentures.

2. A dental apparatus for determining the occlusion of dental plates comprising a base member to be connected to a denture, a rigid projection on said base member, a vertically adjustable screw on said base member, a resilient pad operatively connected to an opposing denture and a platform operatively connected to said opposing denture, said rigid projection being adapted to contact and bear against said resilient pad when said dentures are caused to approach each other, said vertically adjustable screw and platform being oppositely disposed so as to limit the approach of said dentures to a predetermined extent.

3. A dental apparatus for determining the occlusion of dental plates comprising a base member to be connected to a denture, a rigid projection on said base member, a vertically adjustable screw on said base member, a ring member disposed on an opposing denture, a platform integral with said ring member and a resilient pad retained by said ring member on said opposing denture, said rigid projection being adapted to contact and depress said resilient pad when said dentures are caused to approach each other in normal closing fashion, said vertically adjustable screw and platform being oppositely disposed so as to limit the approach of said dentures to a predetermined extent.

4. A method of perfecting the occlusion of dental plates in situ which comprises securing a base member having a rigid, smooth projection thereon to one of a pair of dentures, securing a resilient pad having a rigid, smooth outer face to the other of said dentures, applying an abrasive to the cusps of the teeth of said dentures and causing said dentures to go through the movements of mastication while said projection is depressing said resilient pad so that said teeth are caused to be milled by said abrasive while the dentures are firmly seated against the gums of the patient.

5. A dental apparatus for determining the occlusion of completed dentures comprising a base member to be connected to one of said dentures so as to be disposed centrally thereof, connecting means radiating from said base member to effect said connection of said base member to the inner portion of said denture so as to leave the teeth of said denture unobstructed, an opposing denture, a rigid projection and a resilient member respectively connected to said base member and said opposing denture, the teeth of said opposing denture being unobstructed thereby, said projection being adapted to bear against the surface of and depress said resilient member when the teeth of the respective dentures are brought into occlusion.

6. A dental apparatus for determining the occlusion of dental plates comprising a base member to be connected to a denture, means to adjust said base member radially to facilitate said connection, said means comprising screw threaded pins maintained by said base member and extensible or retractable when turned so as to vary the planar area of the base member, a projection on said base member and a yieldable member secured to an opposing denture, said projection being adapted to depress said yieldable member when said dentures are caused to approach each other.

NATHAN OPOTOW.